United States Patent
Huang et al.

(10) Patent No.: US 11,770,038 B2
(45) Date of Patent: Sep. 26, 2023

(54) ROTOR STRUCTURE, PERMANENT MAGNET AUXILIARY SYNCHRONOUS RELUCTANCE MOTOR, AND ELECTRIC VEHICLE

(71) Applicant: GREE ELECTRIC APPLIANCES, INC. OF ZHUHAI, Guangdong (CN)

(72) Inventors: Hui Huang, Zhuhai (CN); Yusheng Hu, Zhuhai (CN); Bin Chen, Zhuhai (CN); Tong Tong, Zhuhai (CN); Yong Xiao, Zhuhai (CN); Suhua Lu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 378 days.

(21) Appl. No.: 16/981,255

(22) PCT Filed: Dec. 7, 2018

(86) PCT No.: PCT/CN2018/119781
§ 371 (c)(1),
(2) Date: Sep. 15, 2020

(87) PCT Pub. No.: WO2019/174312
PCT Pub. Date: Sep. 19, 2019

(65) Prior Publication Data
US 2021/0044166 A1    Feb. 11, 2021

(30) Foreign Application Priority Data
Mar. 16, 2018    (CN) .......................... 201810219844.3

(51) Int. Cl.
*H02K 1/27*    (2022.01)
*B60K 1/00*    (2006.01)
(Continued)

(52) U.S. Cl.
CPC ............. *H02K 1/2766* (2013.01); *B60K 1/00* (2013.01); *H02K 21/14* (2013.01); *H02K 29/03* (2013.01); *H02K 2213/03* (2013.01)

(58) Field of Classification Search
CPC ........ B60K 1/00; H02K 1/2766; H02K 21/14; H02K 29/03; H02K 2213/03; H02K 1/2773; Y02T 10/64
(Continued)

(56) References Cited

U.S. PATENT DOCUMENTS 6,008,559 A * 12/1999 Asano .................... H02K 1/276
310/216.073
8,102,091 B2 * 1/2012 Ionel .................... H02K 1/2766
310/156.53
(Continued)

FOREIGN PATENT DOCUMENTS

| CN | 202444345 U | 9/2012 |
|---|---|---|
| CN | 202444347 U | 9/2012 |

(Continued)

OTHER PUBLICATIONS

Extended European Search Report for European Application No. 18909325.5 dated Mar. 17, 2021 (14 pages).
(Continued)

*Primary Examiner* — Alex W Mok
(74) *Attorney, Agent, or Firm* — J. Miguel Hernandez; James R. Gourley; Carstens, Allen & Gourley, LLP

(57) ABSTRACT

A rotor structure, a permanent magnet auxiliary synchronous reluctance motor and an electric vehicle. The rotor structure includes a rotor body, and permanent magnet slot groups are disposed on the rotor body; the permanent magnet slot groups each include an outer layer permanent magnet slot; and a third bent slot and a fourth bent slot are further disposed on the rotor body. A third angle is formed by a
(Continued)

length directional geometric center line of the third bent slot and a length directional geometric center line of a first segment of the outer layer permanent magnet slot a fourth angle is formed between a length directional geometric center line of the fourth bent slot and a length directional geometric center line of a second segment of the outer layer permanent magnet slot.

15 Claims, 3 Drawing Sheets

(51) Int. Cl.
*H02K 21/14* (2006.01)
*H02K 1/276* (2022.01)
*H02K 29/03* (2006.01)

(58) Field of Classification Search
USPC .................................................. 310/156.56
See application file for complete search history.

(56) References Cited

U.S. PATENT DOCUMENTS

| | | | | |
|---|---|---|---|---|
| 8,546,990 | B2* | 10/2013 | Suzuki | H02K 1/2766 |
| | | | | 310/156.53 |
| 8,760,026 | B2* | 6/2014 | Suzuki | H02K 1/2766 |
| | | | | 310/156.53 |
| 9,231,445 | B2 | 1/2016 | Sano | |
| 9,461,510 | B2* | 10/2016 | Lillington | H02K 1/28 |
| 2011/0241468 | A1* | 10/2011 | Inagaki | H02K 1/2766 |
| | | | | 310/156.32 |
| 2013/0106226 | A1 | 5/2013 | Aoyama | |
| 2013/0270958 | A1 | 10/2013 | Takahashi | |
| 2016/0322872 | A1* | 11/2016 | Takahashi | H02K 1/2766 |
| 2017/0187257 | A1* | 6/2017 | Liu | H02K 21/16 |

FOREIGN PATENT DOCUMENTS

| | | |
|---|---|---|
| CN | 204089392 U | 1/2015 |
| CN | 104638864 A | 5/2015 |
| CN | 105553143 A | 5/2016 |
| CN | 105703502 A | 6/2016 |
| CN | 205566051 U | 9/2016 |
| CN | 205693464 U | 11/2016 |
| CN | 106329773 A | 1/2017 |
| CN | 106936284 A | 7/2017 |
| CN | 108336842 A | 7/2018 |
| CN | 108566005 A | 9/2018 |
| CN | 208015475 U | 10/2018 |
| CN | 208015476 U | 10/2018 |
| DE | 102015212127 A1 | 1/2017 |
| EP | 1261103 A1 | 11/2002 |
| JP | 10051984 A * | 2/1998 |
| WO | 2006/047519 A2 | 5/2006 |
| WO | 2017061244 A1 | 4/2017 |

OTHER PUBLICATIONS

International Search Report for Application No. PCT/CN2018/119781 dated Mar. 7, 2019 (3 pages).

Office Action for European Application No. EP 18909325.5 dated Mar. 23, 2023 (10 pages).

* cited by examiner

ROTOR STRUCTURE, PERMANENT MAGNET AUXILIARY SYNCHRONOUS RELUCTANCE MOTOR, AND ELECTRIC VEHICLE

CROSS REFERENCE TO RELATED APPLICATIONS

This application claims all benefits accruing under 35 U.S.C. § 119 from China Patent Application No. 201810219844.3, filed on Mar. 16, 2018 in the China National Intellectual Property Administration, the entire content of which is hereby incorporated by reference. This application is a national phase under 35 U.S.C. § 120 of international patent application PCT/CN2018/119781, entitled "ROTOR STRUCTURE, PERMANENT MAGNET AUXILIARY SYNCHRONOUS RELUCTANCE MOTOR, AND ELECTRIC VEHICLE" filed on Dec. 7, 2018, and published as WO 2019/174312 on Mar. 16, 2018, the content of which is also hereby incorporated by reference.

TECHNICAL FIELD

The present application relates to the technical field of a motor, and particularly to a rotor structure, a permanent magnet auxiliary synchronous reluctance motor, and an electric vehicle.

BACKGROUND

Torque components of a permanent magnet synchronous reluctance motor include permanent magnet torque and reluctance torque. Affected by the reluctance torque, the rotor structure has a greater influence on a torque ripple. Therefore, the optimization of torque ripples has always been one of the focus of the research and development of the motor. The torque ripples of the permanent magnet reluctance motor in the art are relative low, which affects the power of the motor.

SUMMARY

The main objective of the present application is to provide a rotor structure, a permanent magnet auxiliary synchronous reluctance motor, and an electric vehicle, to solve the problem of low power of the motor in the art.

In order to achieve the above objective, according to an aspect of the present application, a rotor structure is provided. The rotor structure includes a rotor body provided with permanent magnet slots groups; the permanent magnet slots groups each includes an outer layer permanent magnet slot; the rotor body is further provided with a third bent slot and a fourth bent slot; the third bent slot is in communication with a first segment of the outer layer permanent magnet slot; the fourth bent slot is in communication with a second segment of the outer layer permanent magnet slot; a length directional geometric center line of the third bent slot and a length directional geometric center line of the first segment of the outer layer permanent magnet slot form a third angle; a length directional geometric center line of the fourth bent slot and a length directional geometric center line of the second segment of the outer layer permanent magnet slot form a fourth angle; an extension line of a side wall of the third bent slot and an outer edge of the rotor body intersect at a first point; an extension line of a side wall of the fourth bent slot and the outer edge of the rotor body intersect at a second point; A1 denotes a central angle corresponding to an arc of the first point and the second point is A1; and A1 >0.63×360°/p is satisfied, wherein p denotes a number of poles of the rotor structure.

Further, the third bent slot and the fourth bent slot are disposed at two sides of a direct-axis of the rotor body respectively; the extension line of the side wall of the third bent slot proximate to the direct-axis and the outer edge of the rotor body intersect at the first point; and the extension line of the side wall of the fourth bent slot proximate to the direct-axis and the outer edge of the rotor body intersect at the second point.

Further, the first segment of the outer layer permanent magnet slot extends outwardly in a radial direction of the rotor body; the second segment of the outer layer permanent magnet slot extends outwardly in a radial direction of the rotor body; and an intermediate segment of the outer layer permanent magnet slot is arranged to protrude towards a rotation shaft hole of the rotor body.

Further, the permanent magnet slots groups each further include an inner layer permanent magnet slot; the rotor body is further provided with a first bent slot and a second bent slot; the first bent slot is in communication with a first segment of the inner layer permanent magnet slot; a length directional geometric center line of the first bent slot and a length directional geometric center line of the first segment of the inner layer permanent magnet slot form a first angle; the second bent slot is in communication with a second segment of the inner layer permanent magnet slot and a length directional geometric center line of the second bent slot and a length directional geometric center line of the second segment of the inner layer permanent magnet slot form a second angle.

Further, a first flux barrier is formed between a side wall of the first bent slot and/or the second bent slot proximate to the outer edge of the rotor body, and the outer edge of the rotor body; second flux barrier is formed between the outer edge of the rotor body and a side wall of the third bent slot and/or the fourth bent slot proximate to the outer edge of the rotor body; and 0.18×360°/p>A2+A3 >0.13×360°/p is satisfied, A2 denotes a central angle corresponding to an arc of the first flux barrier, and A3 denotes a central angle corresponding to an arc of the second flux barrier.

Further, A2<A3 <1.5×Wt, and Wt denotes a central angle corresponding to a width of a stator slot.

Further, 0.25<A2/(A2+A3)<0.5.

Further, J denotes an angle formed by a tangent of the rotor body passing the first point and the extension line of the side wall of the third bent slot proximate to the direct-axis, wherein J<155°; and/or J1 denotes an angle formed by a tangent of the rotor body passing the second point and the extension line of the side wall of the fourth bent slot proximate to the direct-axis, wherein J1<155°.

Further, the side wall of the third bent slot proximate to the direct-axis extends outwardly in a radial direction of the rotor body and spreads gradually away from the direct-axis, and/or the side wall of the fourth bent slot proximate to the direct-axis extends outwardly in a radial direction of the rotor body and spreads gradually away from the direct-axis.

According to another aspect of the present application, a permanent magnet auxiliary synchronous reluctance motor is provided, and the motor includes any one of the rotor structures above.

According to another aspect of the present application, an electric vehicle is provided, and the electric vehicle includes any one of the rotor structure above.

By applying the technical solutions of the present application, and by setting the relationship between the number p of poles of the rotor structure and the angle between the bent slots, the directions of the magnetic induction lines are optimized, thereby increasing the output power of the permanent magnet torque, and further increasing the power of the motor.

BRIEF DESCRIPTION OF THE DRAWINGS

The accompanying drawings, which constitute a part of the present application, are used to provide further understanding of the present application. The illustrative embodiments of the present application and the descriptions thereof are used to interpret the present application, but not intended to constitute any improper limitation on the present application. In the drawings.

DETAILED DESCRIPTION OF THE EMBODIMENTS

It should be noted that, under the premise of no conflict, the embodiments in the present application and the features included in the embodiments can be combined with each other. The present application will be described in details below with reference to the drawings in connection with the embodiments.

Referring to FIGS. 1 to 4, a rotor structure is provided according to embodiments of the present application.

Specifically, the rotor structure includes a rotor body 10. The rotor body 10 is provided with permanent magnet slots groups. The permanent magnet slots groups each include an outer layer permanent magnet slot 12. The rotor body 10 is further provided with a third bent slot 23 and a fourth bent slot 24. The third bent slot 23 is in communication with a first segment of the outer layer permanent magnet slot 12, and the fourth bent slot 24 is in communication with a second segment of the outer layer permanent magnet slot 12. A length directional geometric center line of the third bent slot 23 and a length directional geometric center line of a first segment of the outer layer permanent magnet slot 12 form a third angle. A length directional geometric center line of the fourth bent slot 24 and a length directional geometric center line of the second segment of the outer layer permanent magnet slot 12 form a fourth angle. An extension line of a side wall of the third bent slot 23 and an outer edge of the rotor body 10 intersect at a first point, and an extension line of a side wall of the fourth bent slot 24 and the outer edge of the rotor body 10 intersect at a second point. A1 denotes a central angle corresponding to an arc of a connection line of the first point and the second point, where A1 >0.63×360°/p, where p denotes a number of poles of the rotor structure.

In the present embodiment, directions of magnetic induction lines are optimized by setting a relationship between the number p of poles of the rotor structure and the angle between the bent slots, thereby increasing output power of the permanent magnet torque, and further increasing power of the permanent magnet auxiliary synchronous reluctance motor (hereinafter referred to motor).

Figure 1:
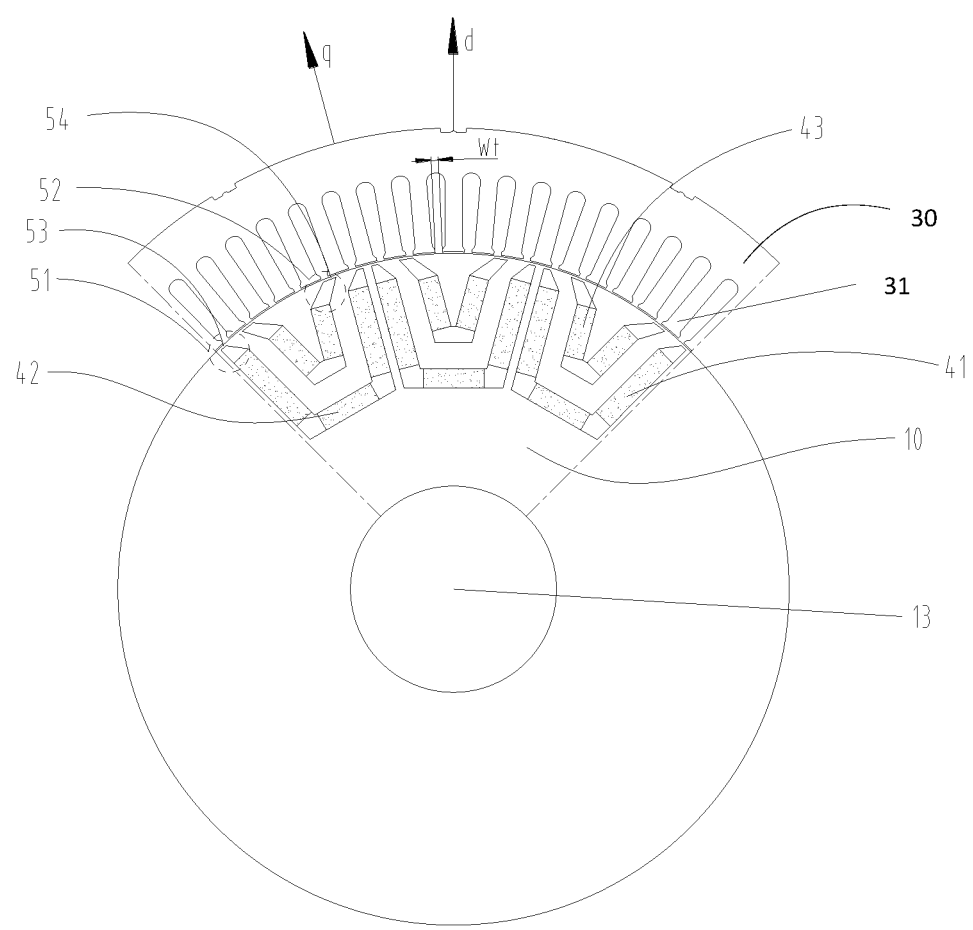
FIG. 1 is a schematic structure diagram illustrating a rotor structure according to a first embodiment of the present application.

In this embodiment, the third bent slot 23 and the fourth bent slot 24 are disposed at two sides of a direct-axis (as shown in FIG. 1, the direct-axis is the d-axis in the figure, and a quadrature-axis is the q-axis in the figure) of the rotor body 10 respectively. An extension line of a side wall of the third bent slot 23 proximate to the direct-axis and an outer edge of the rotor body 10 intersect at a first point. An extension line of a side wall of the fourth bent slot 24 proximate to the direct-axis and the outer edge of the rotor body 10 intersect at a second point, thus achieving a better effect of conducting the magnetic induction lines.

Figure 2:
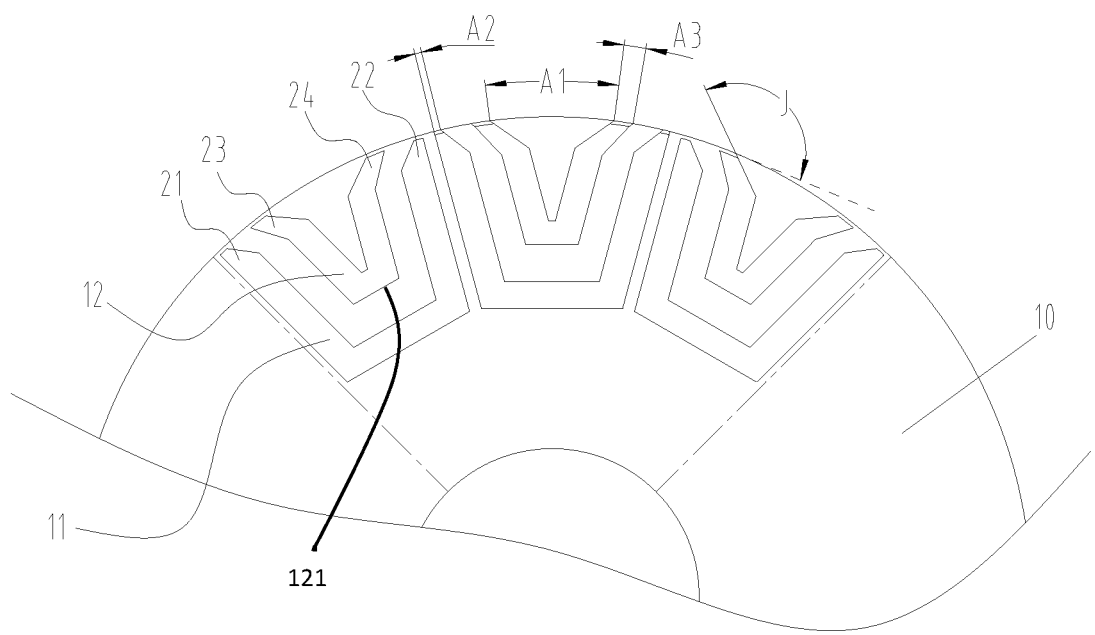
FIG. 2 is a schematic structure diagram illustrating a rotor structure according to a second embodiment of the present application.
Figure 3:
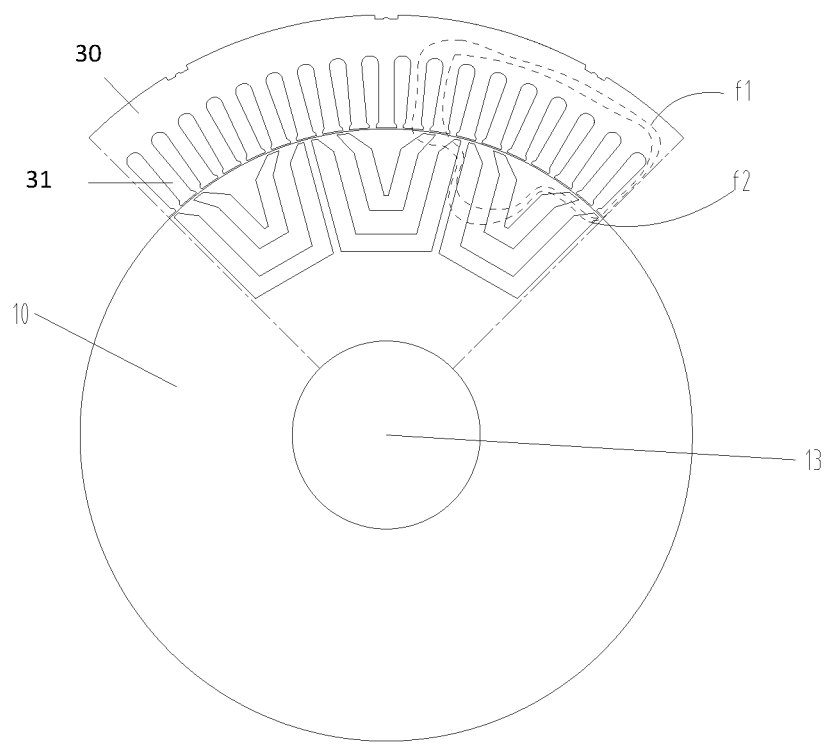
FIG. 3 is a diagram illustrating magnetic induction lines of the rotor structure in a weakened magnetic field according to an embodiment of the present application.
Figure 4:
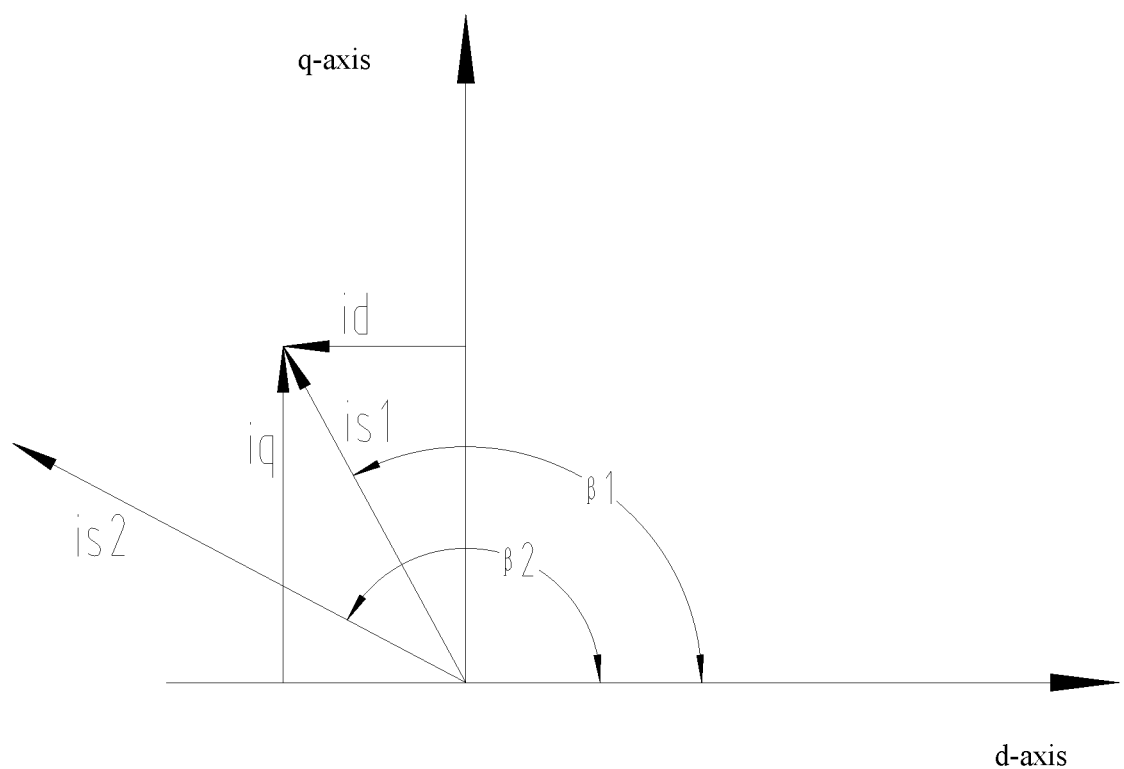
FIG. 4 is a schematic diagram illustrating current vectors in a weakened magnetic field and a deeply weakened magnetic field of a motor according to the present application.

As shown in FIG. 2, the first segment of the outer layer permanent magnet slot 12 extends outwardly in a radial direction of the rotor body 10. The second segment of the outer layer permanent magnet slot 121 extends outwardly in a radial direction of the rotor body 10. An intermediate segment 121 of the outer layer permanent magnet slot 12 is arranged to protrude towards a rotation shaft hole 13 of the rotor body 10. Thus the distribution of the magnetic induction lines of each magnetic circuit can be further regulated, reducing a local saturation.

In an embodiment, the permanent magnet slots groups each further include an inner layer permanent magnet slot 11. The rotor body 10 is further provided with a first bent slot 21 and a second bent slot 22. The first bent slot 21 is in communication with a first segment of the inner layer permanent magnet slot 11. A length directional geometric center line of the first bent slot and a length directional geometric center line of the first segment of the inner layer permanent magnet slot 11 form a first angle. The second bent slot 22 is in communication with a second segment of the inner layer permanent magnet slot 11. A length directional geometric center line of the second bent slot and a length directional geometric center line of the second segment of the inner layer permanent magnet slot 11 form a second angle. Thus, a better effect of conducting the magnetic induction lines can be realized.

As shown in FIGS. 1 and 2, a first flux barrier 53 is formed between the outer edge of the rotor body 10 and a side wall of the first bent slot 21 and/or a side wall of the second bent slot 22 proximate to the outer edge of the rotor body 10, and a second flux barrier 54 is formed between a side wall of the third bent slot 23 and/or a side wall of the fourth bent slot 24 proximate to the outer edge of the rotor body 10 and the outer edge of the rotor body 10, and $0.18 \times 360°/p > A2+A3 > 0.13 \times 360°/p$ is satisfied, where A2 denotes a central angle corresponding to an arc of the first flux barrier 53, and A3 denotes a central angle corresponding to an arc of the second flux barrier 54. Thus, the reluctance torque ripple of the torque component of the motor is optimized.

$A2 < A3 < 1.5 \times Wt$ is satisfied, where Wt denotes a central angle corresponding to a width of a stator slot. Thus, the torque ripple can be reduced.

Further, $0.25 < A2/(A2+A3) < 0.5$ is satisfied. Such an arrangement ensures the salient pole ratio not to decrease significantly while increasing an area of a magnetic flux conduction portion at an outer periphery of the rotor, thereby increasing flux linkage of permanent magnets.

In an embodiment, J denotes an angle formed by a tangent of the rotor body 10 passing the first point and the extension line of the side wall of the third bent slot 23 proximate to the direct-axis, where J<155°. Alternatively, J1 denotes an angle formed by a tangent of the rotor body 10 passing the second point and the extension line of the side wall of the fourth bent slot 24 proximate to the direct-axis, where J1<155°. Of course, the two requirements can be met simultaneously. Such an arrangement can mitigate torque ripples caused by the local magnetic saturation.

In an embodiment, the side wall of the third bent slot 23 proximate to the direct-axis extends outwardly in a radial direction of the rotor body 10 and spreads gradually away from the direct-axis. Alternatively, the side wall of the fourth bent slot 24 proximate to the direct-axis extends outwardly in the radial direction of the rotor body 10 and spreads gradually away from the direct-axis. Of course, the two requirements can be met simultaneously. Thus a better effect of conducting the magnetic induction lines can be realized.

The rotor structures of the above embodiments can also be applied in the technical field of motor equipment. That is, according to another aspect of the present application, a permanent magnet auxiliary synchronous reluctance motor is provided. The permanent magnet auxiliary synchronous reluctance motor includes a rotor structure, and the rotor structure is any one of the above-mentioned rotor structures.

The rotor structures of the above embodiments can also be applied in the technical field of vehicle equipment. That is, according to another aspect of the present application, an electric vehicle is provided. The electric vehicle includes a rotor structure, and the rotor structure is any one of the above-mentioned rotor structures.

In an embodiment, a rotor is arranged inside a stator through a shaft hole. The stator 30 includes stator teeth 31. The stator 30 and the rotor have an air gap therebetween. The rotor has a plurality of poles. Each pole has a plurality of permanent magnet slots. Each permanent magnet slot is a hollow air slot, and penetrates in an axial direction of an iron core. Each permanent magnet is arranged in a corresponding permanent magnet slot. After being assembled, portions of the permanent magnet slots, which are proximate to the outer periphery of the rotor, are not fully filled and form an end portion 51 of an inner layer arm permanent magnet slot and an end portion 52 of an outer layer arm permanent magnet slot. A first flux barrier 53 having a thin-wall structure is disposed between the end portion 52 of the outer layer arm permanent magnet slot and the air gap, and a second flux barrier 54 having a thin-wall structure is disposed between the end portion 51 of the inner layer arm permanent magnet slot and the air gap, thus playing a role of structurally connecting punching sheets of the rotor as a whole, preventing the flux linkage passing through the magnetic circuit of the thin-wall structures in a magnetic saturation state to realize magnetic isolation.

In an embodiment, the permanent magnet slot is a U-shaped or V-shaped structure. The U-shaped structure can be integrated, that is, the sections of the integrated U-shaped structure are continuous. Of course, taking account of the complexity of the manufacturing process of a permanent magnet having an integrated U-shaped structure, the U-shaped structure can also be formed by combining a plurality of permanent magnet slots. For example, two inner layer arm permanent magnet slots and one inner layer bottom permanent magnet slot are shown in FIG. 1. The "plate-shaped" permanent magnets are correspondingly arranged in the permanent magnet slots, such as the inner layer arm permanent magnet 41, the inner layer bottom permanent magnet 42, and the outer layer arm permanent magnet 43. The inner layer permanent magnet slot and the outer layer permanent magnet slot both can be U-shaped, or both can be V-shaped, or can be a combination of being U-shaped or V-shaped. Compared with the main body portion of the permanent magnet slot, the end portions of the permanent magnet slot have a more obvious developing trend outwardly. The d-axis is a center line for each magnetic pole, that is, an open angle formed by the end portions of the permanent magnet slot is greater than an opening angle formed by the permanent magnet. The end portion of the permanent magnet slot is a portion starting from a point where the contour of the main portion of the permanent magnet slot is bent, even if the permanent magnet is not filled up to the bent point of the main portion of the permanent magnet slot. Two bent edges of the end portion of the permanent magnet slot are not parallel to each other, and one bent edge proximate to the d-axis has a larger bend. Thus, the smallest distance between the two bent edges is proximate to the outer periphery of the rotator, and the largest distance between the two bent edges is proximate to the bent point, so that the magnetic circuit can be adapted for different penetration depth of magnetic field according to different loads, and that the torque ripple maintains at a corresponding level for a fractional load and a large load.

In an embodiment, the reluctance torque component is affected by the reluctance of the magnetic circuit. The level of the torque ripple can be reduced when a central angle A2 corresponding to an arc of the internal layer flux barrier pole, a central angle A3 corresponding to an arc of the outer flux barrier pole, and a central angle Wt corresponding to a width of a stator slot opening satisfy the following relationship. the central angle of the arc of the internal flux barrier and the central angle of the arc of the outer flux barrier: satisfy A2<A3 <1.5×Wt. Furthermore, the increase of the permanent magnet torque component also has effects of improving the resultant torque ripple. In order to increase the permanent magnet torque component, the magnetic flux conduction area in the d-axial direction is increased and a sum of the lengths (A2, A3) of the flux barriers at the end portions of the permanent magnet slots is limited to a certain percentage, thus the salient pole ratio can be ensured not to decrease significantly, while the area of the magnetic flux conduction portion at the outer periphery of the rotor is decreased, thereby increasing the flux linkage of permanent magnets, wherein A1, A2 and A3 satisfy the following relationship:

$$A1>0.63\times 360°/p; \text{ and}$$

$$0.18\times 360°/p > A2+A3 > 0.13\times 360°/p, \text{ where } p \text{ is a number of poles.}$$

Further, in a deeply weakened magnetic field, a d-axis component of a resultant current is1 increases; the q-axis component of the resultant current is1 decreases; and the saturation degree of the q-axis decreases. Therefore, it is more sensitive to the lengths of the flux barriers. The torque ripple can be ensured to be at a lower level in the deeply weakened magnetic field, when the following relationship can be satisfied.

Excessive saturation of the flux circuit can also lead to the increase of the torque ripple, therefore circumscribed edges of the end portions of the outer layer arm permanent magnet slot proximate to the d-axis can only spread outwardly to a certain extent, otherwise a sharp angle will be formed at the end portions of the permanent magnet slots, thus causing a serious saturation. Therefore, during designing the circumscribed edges, an angle J, formed by the circumscribed edge and a tangent passing an intersection point of the circumscribed edge and the outer periphery of the rotor, is preferred less than 155°.

Moreover, the above design analysis is based on the motor of a type 72S12P. Changes of slot-pole cooperation of the motor, scaling based on equal proportions, and limitations of changes of dimensions can be considered as a technology that can easily be mastered by those skilled in the art inspired by the present application.

In view of the above description, it can be understood that the above-mentioned embodiments of the present application achieve the following technical effects.

The ripple level of the reluctance torque of the torque components of the motor is optimized by designing the positions of the flux barriers at the end portions of the inner layer permanent magnet slot and the outer layer permanent magnet slot. The magnetic flux conduction area of the d-axis is increased by a structure of the circumscribed edges of the outer flux barrier. By increasing the percentage of the permanent magnet torque component and changing the phases of the permanent magnet torque and the reluctance torque, the peaks and valleys of the permanent magnet torque component and the reluctance torque component are staggered in time, thereby achieving a torque ripple of a low level. Through a research on the relationship of the lengths of the internal layer flux barrier and the outer layer flux barrier, the length of the internal flux barrier is set to be less than the length of the outer flux barrier in a reasonable range, thus the q-axis component is reduced in the deeply weakened magnetic field, and under the effect of the reduction of the saturation, it is more sensitive to the lengths of the flux barriers. In the case that the pre-designed value is small, the level of the torque ripple under the deeply weakened magnetic field can be reduced.

The above descriptions are merely preferred embodiments of the present application but not intended to limit the present application. For those skilled in the art, the present application may have various modifications and changes. Any modification, equivalent replacement, or improvement made within the spirit and principle of the present application shall fall in the protection scope of the present application.

What is claimed is:

1. A rotor structure, comprising:
    a rotor body provided with permanent magnet slots groups, the permanent magnet slots groups each comprising an outer layer permanent magnet slot, the rotor body being further provided with a third bent slot and a fourth bent slot;
    wherein the third bent slot is in communication with a first segment of the outer layer permanent magnet slot; the fourth bent slot is in communication with a second segment of the outer layer permanent magnet slot; a length directional geometric center line of the third bent slot and a length directional geometric center line of the first segment of the outer layer permanent magnet slot form a third angle; a length directional geometric center line of the fourth bent slot and a length directional geometric center line of the second segment of the outer layer permanent magnet slot form a fourth angle;
    an extension line of a side wall of the third bent slot proximate to a d-axis and an outer edge of the rotor body intersect at a first point; an extension line of a side wall of the fourth bent slot proximate to the d-axis and the outer edge of the rotor body intersect at a second point; A1 denotes a central angle corresponding to an arc of a connection line of the first point and the second point; and A1 >0.63×360°/p is satisfied, wherein p denotes a number of poles of the rotor structure;
    the permanent magnet slots groups each further comprise an inner layer permanent magnet slot, the rotor body is further provided with a first bent slot and a second bent slot, the first bent slot is in communication with a first segment of the inner layer permanent magnet slot; a length directional geometric center line of the first bent slot and a length directional geometric center line of the first segment of the inner layer permanent magnet slot form a first angle; the second bent slot is in communication with a second segment of the inner layer permanent magnet slot and a length directional geometric center line of the second bent slot and a length directional geometric center line of the second segment of the inner layer permanent magnet slot form a second angle,
    a first flux barrier is formed between a side wall of the first bent slot and the second bent slot proximate to the outer edge of the rotor body, and the outer edge of the rotor body;
    a second flux barrier is formed between the outer edge of the rotor body and a side wall of the third bent slot and the fourth bent slot proximate to the outer edge of the rotor body; and 0.18×360°/p>A2+A3 >0.13×360°/p is satisfied, A2 denotes a central angle corresponding to an arc of the first flux barrier, and A3 denotes a central angle corresponding to an arc of the second flux barrier.

2. The rotor structure of claim 1, wherein the third bent slot and the fourth bent slot are disposed at two sides of a direct-axis of the rotor body respectively; the extension line of the side wall of the third bent slot proximate to the direct-axis and the outer edge of the rotor body intersect at the first point; and the extension line of the side wall of the fourth bent slot proximate to the direct-axis and the outer edge of the rotor body intersect at the second point.

3. The rotor structure of claim 2, wherein
    J denotes an angle formed by a tangent of the rotor body passing the first point and the extension line of the side wall of the third bent slot proximate to the direct-axis, wherein J<155°; and
    J1 denotes an angle formed by a tangent of the rotor body passing the second point and the extension line of the side wall of the fourth bent slot proximate to the direct-axis, wherein J1<155°.

4. The rotor structure of claim 2, wherein
    the side wall of the third bent slot proximate to the direct-axis extends outwardly in a radial direction of the rotor body and spreads gradually away from the direct-axis, and
    the side wall of the fourth bent slot proximate to the direct-axis extends outwardly in a radial direction of the rotor body and spreads gradually away from the direct-axis.

5. The rotor structure of claim 2, wherein
    J denotes an angle formed by a tangent of the rotor body passing the first point and the extension line of the side wall of the third bent slot proximate to the direct-axis,
    wherein J<155°; or
    J1 denotes an angle formed by a tangent of the rotor body passing the second point and the extension line of the side wall of the fourth bent slot proximate to the direct-axis, wherein J1<155°.

6. The rotor structure of claim 2, wherein
the side wall of the third bent slot proximate to the direct-axis extends outwardly in a radial direction of the rotor body and spreads gradually away from the direct-axis, or
the side wall of the fourth bent slot proximate to the direct-axis extends outwardly in a radial direction of the rotor body and spreads gradually away from the direct-axis.

7. The rotor structure of claim 1, wherein the first segment of the outer layer permanent magnet slot extends outwardly in a radial direction of the rotor body; the second segment of the outer layer permanent magnet slot extends outwardly in a radial direction of the rotor body; and an intermediate segment of the outer layer permanent magnet slot is arranged to protrude towards a rotation shaft hole of the rotor body.

8. The rotor structure of claim 1, wherein $0.25 < A2/(A2+A3) < 0.5$.

9. A permanent magnet auxiliary synchronous reluctance motor, comprising the rotor structure of claim 1.

10. The motor of claim 9, wherein the rotor body is arranged inside a stator through a shaft hole;
the stator comprises stator teeth; and
the stator and the rotor body have an air gap therebetween.

11. The motor of claim 9, wherein $A2 < A3 < 1.5 \times Wt$, and Wt denotes a central angle corresponding to a width of a stator slot.

12. An electric vehicle, comprising the rotor structure of claim 1.

13. The rotor structure of claim 1, wherein the outer layer permanent magnet slot is a U-shaped or V-shaped structure; and
the inner layer permanent magnet slot is a U-shaped or V-shaped structure.

14. The rotor structure of claim 1, wherein the outer layer permanent magnet slot comprises two outer layer arm permanent magnet slots; and
two outer layer arm permanent magnets are arranged in the two outer layer arm permanent magnet slots respectively.

15. The rotor structure of claim 14, wherein the inner layer permanent magnet slot comprises two inner layer arm permanent magnet slots and an inner layer bottom permanent magnet slot;
two inner layer arm permanent magnets are arranged in the two inner layer arm permanent magnet slots respectively; and
an inner layer bottom permanent magnet is arranged in the inner layer bottom permanent magnet slot.

* * * * *